United States Patent
Lee et al.

(10) Patent No.: US 11,368,731 B2
(45) Date of Patent: *Jun. 21, 2022

(54) METHOD AND APPARATUS FOR SEGMENTING DATA

(71) Applicant: ARRIS Enterprises LLC, Suwanee, GA (US)

(72) Inventors: Robert Erich Lee, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,634

(22) Filed: Jun. 3, 2020

(65) Prior Publication Data

US 2020/0296435 A1 Sep. 17, 2020

Related U.S. Application Data

(63) Continuation of application No. 15/599,635, filed on May 19, 2017, now Pat. No. 10,701,415.

(60) Provisional application No. 62/338,897, filed on May 19, 2016.

(51) Int. Cl.
| | |
|---|---|
| H04N 21/2383 | (2011.01) |
| H04N 21/2187 | (2011.01) |
| H04N 21/84 | (2011.01) |
| H04N 21/643 | (2011.01) |
| H04N 21/234 | (2011.01) |
| H04N 21/845 | (2011.01) |
| H04L 65/65 | (2022.01) |
| H04L 65/60 | (2022.01) |

(52) U.S. Cl.
CPC ....... *H04N 21/2383* (2013.01); *H04L 65/605* (2013.01); *H04L 65/608* (2013.01); *H04N 21/2187* (2013.01); *H04N 21/234* (2013.01); *H04N 21/643* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | |
|---|---|---|
| 5,956,088 A | 9/1999 | Shen et al. |
| 6,370,193 B1 | 4/2002 | Lee |
| 6,437,711 B1 | 8/2002 | Nieminen et al. |
| 6,625,750 B1 | 9/2003 | Duso et al. |
| 9,014,313 B2 | 4/2015 | Park et al. |

(Continued)

*Primary Examiner* — An Son P Huynh
(74) *Attorney, Agent, or Firm* — Chernoff, Vilhauer, McClung & Stenzel, LLP

(57) ABSTRACT

A method and system is provided for segmenting blocks of video data into chunks for consumption by player devices to create a new block to improve overall chunk creation. In one embodiment, issues that occur at the PCP block boundaries are handled by creating two chunks, one from the tail of content from the previous block and the other from the start of the new block, with the sums of the two chunks approximately equal to the target duration, improving manifest and chunk cadence creation. In another embodiment, chunks are created when the sink 104 requests a new manifest regardless of whether a proxy chunk timer pulling data from the PCP block has expired or not.

5 Claims, 10 Drawing Sheets

(56) References Cited

U.S. PATENT DOCUMENTS

| | | |
|---|---|---|
| 9,124,947 B2 | 9/2015 | Bjordammen et al. |
| 9,232,263 B2 | 1/2016 | Baker et al. |
| 9,973,785 B1 | 5/2018 | Yang et al. |
| 2003/0033602 A1 | 4/2003 | Gibbs et al. |
| 2007/0209005 A1 | 9/2007 | Shaver et al. |
| 2009/0063681 A1 | 3/2009 | Ramakrishnan et al. |
| 2010/0138718 A1 | 6/2010 | Frederiksen et al. |
| 2010/0158101 A1 | 6/2010 | Wu et al. |
| 2010/0199318 A1 | 8/2010 | Chang et al. |
| 2010/0278170 A1 | 11/2010 | Lee |
| 2011/0246622 A1 | 10/2011 | Pantos et al. |
| 2012/0042091 A1* | 2/2012 | McCarthy .......... H04N 21/8456 709/231 |
| 2012/0047542 A1 | 2/2012 | Lewis et al. |
| 2012/0137015 A1 | 5/2012 | Sun |
| 2012/0314761 A1 | 12/2012 | Melnyk et al. |
| 2014/0150019 A1 | 5/2014 | Ma et al. |
| 2014/0164352 A1 | 6/2014 | Denninghoff |
| 2014/0219357 A1 | 8/2014 | Chuang et al. |
| 2014/0229976 A1 | 8/2014 | Ma et al. |
| 2014/0258366 A1 | 9/2014 | L'Heureux |
| 2015/0007239 A1 | 1/2015 | Cranman et al. |
| 2015/0325268 A1 | 10/2015 | Berger et al. |
| 2015/0350717 A1 | 10/2015 | Pantos et al. |
| 2016/0212190 A1 | 7/2016 | Kim et al. |
| 2017/0289639 A1 | 10/2017 | Reisner |

\* cited by examiner

METHOD AND APPARATUS FOR SEGMENTING DATA

CROSS-REFERENCE TO RELATED APPLICATIONS

This application is a continuation of U.S. Patent application Ser. No. 15/59,9635, filed on May 19, 2017 and which claims the benefit of priority under 35 U.S.C. § 119(e) to U.S. Provisional Patent Application No. 62/338,897, entitled "HLS SEGMENTING PROTOCOL," by Robert Erich Lee and Paul Moroney, filed May 19, 2016, each of which hereby incorporated by reference herein.

BACKGROUND

1. Field of the Invention

The present invention relates to systems and methods for coding data, and in particular to a system and method for coding live video data among different block and segment sizes.

2. Description of the Related Art

DLNA (Digital Living Network Alliance) is an industry-wide standard for sharing data over a home network. It permits DLNA-compatible devices to transmit and/or receive streaming data between laptops, televisions, smartphones, and other devices.

FIG. 1 is a diagram showing a typical media network complying with the DLNA standard. The media network 100 comprises a source 102 communicatively coupled to a sink 104. The source 102 (which may be embodied in a DLNA server) is the device that stores and sends the media stream 106 via transport facility 107 to the sink 104. The sink 104 (which may be embodied in a DLNA client) is a device that receives the data for presentation to the consumer. The source 102 may comprise a variety of devices such as a video server, set top box, gaming console, cloud server, or a personal computer running WINDOWS, or home media servers such as SERVIIO, TWONKYMEDIA, ORB and TVERSITY, while the sink 104 may comprise a smart TV, sound bar, digital radio, cellphone, or personal computer.

It is desirable for DLNA-compliant sources 102 to communicate with sinks 104 that operate under different protocols. For example, many smartphones operate according to the HLS (HTTP Live Streaming) protocol implemented by the APPLE corporation. In HLS, the media program is separated into a plurality of segments (hereinafter alternatively referred to as "chunks") of the same temporal duration, each of which are received and played by the sink 104. The address of each of the media segments is included in a "manifest" that is transmitted from the source 102 to the sink 104. For live streams, the manifest changes with time on a first in-first out (FIFO) basis, with older segments being dropped from the manifest to make room for newer segments. The manifest may describe different versions of each segment (e.g. different resolutions), so that the sink 104 may adapt to changing transmission throughput by requesting segments of reduced resolution (hence reduced size) or increased resolution (hence increased size).

Unfortunately, DLNA is not natively compatible with HLS. One way to stream content from a multi-tuner gateway (GW) or set top box (STB) to wireless clients such as phones and tablets is via a DLNA-to-HLS conversion proxy used in gateway-to-client mobility services. Such mobility services transcode audiovisual (A/V) streams for delivery over HTTP/TCP (hypertext transfer protocol/transmission control protocol) to DLNA clients. This DLNA stream may be encrypted using DTCP (digital transmission content protection) with initialization vectors (IVs) and a content key that change at every PCP block (typically of 8 MB, and not to exceed 128 MB). The IVs and content key are derived from a PCP header nonce in conjunction with a DTCP security layer.

A current implementation of this proxy uses "blind chunking" in which the APPLE iOS client attempts to pull the (possibly) encrypted DLNA content over the TCP connection at the mobility service media production rate and put it into contiguous files at timed intervals without decrypting or examining media timestamps (hence "blind"). This technique is discussed in U.S. Pat. No. 9,338,149, by Paul Moroney, entitled "DLNA/DTCP Stream Conversion for Secure Media Playback," which is hereby incorporated by reference herein. This download rate is subject to the variations of the network router buffer delays and wireless (WiFi) channel. The media segments, or "chunks", are created by pulling content for, e.g. 1 second, over the network and subsequently may have less or more than 1 second of A/V content due to the variations in channel bandwidth over time. Also, the iOS AVPlayer requests content at the HLS TARGETDURATION and this cadence will misalign with the proxy chunk production at various times (e.g., PCP boundaries) due to the current chunk creation implementation. This has been noticed to cause occasional buffering errors, stalls, and duplicate HLS manifest downloads in the iOS AVPlayer decoder/renderer.

What is needed is a system and method to improve the performance of the blind chunking algorithm. Such as system and method is described herein.

SUMMARY

To address the requirements described above, a method and apparatus for coding a live video stream wherein the video stream comprising a plurality of blocks, including a first block and a second block temporally following the first block is disclosed below. In one embodiment, the method comprises (a) determining if a duration of a remaining portion of the first block is greater than or equal to a target duration, (b) if the duration of the remaining portion of the first block is greater than or equal to the target duration, generating a media segment temporally spanning the target duration, (c) if the duration of the remaining portion of the first block is less than the target duration, generating a media segment spanning the remaining portion of the first block, (d) updating a set of media segment identifiers to be published with an identifier of the generated media segment (e) repeating (a)-(d) until no portion of the first block remains, (f) generating a further media segment from a temporally beginning portion of the second block, the further media segment temporally spanning no more than a difference between the target duration and a duration of a temporally last of the media segments generated from the first block, and (g) updating the set of media identifiers to be published with the identifier of the generated further media segment.

In another embodiment, the video stream is encoded by use of an apparatus comprising a processor and a communicatively coupled memory storing instructions for performing the operations described above.

BRIEF DESCRIPTION OF THE DRAWINGS

Referring now to the drawings in which like reference numbers represent corresponding parts throughout.

DETAILED DESCRIPTION

Figure 1:
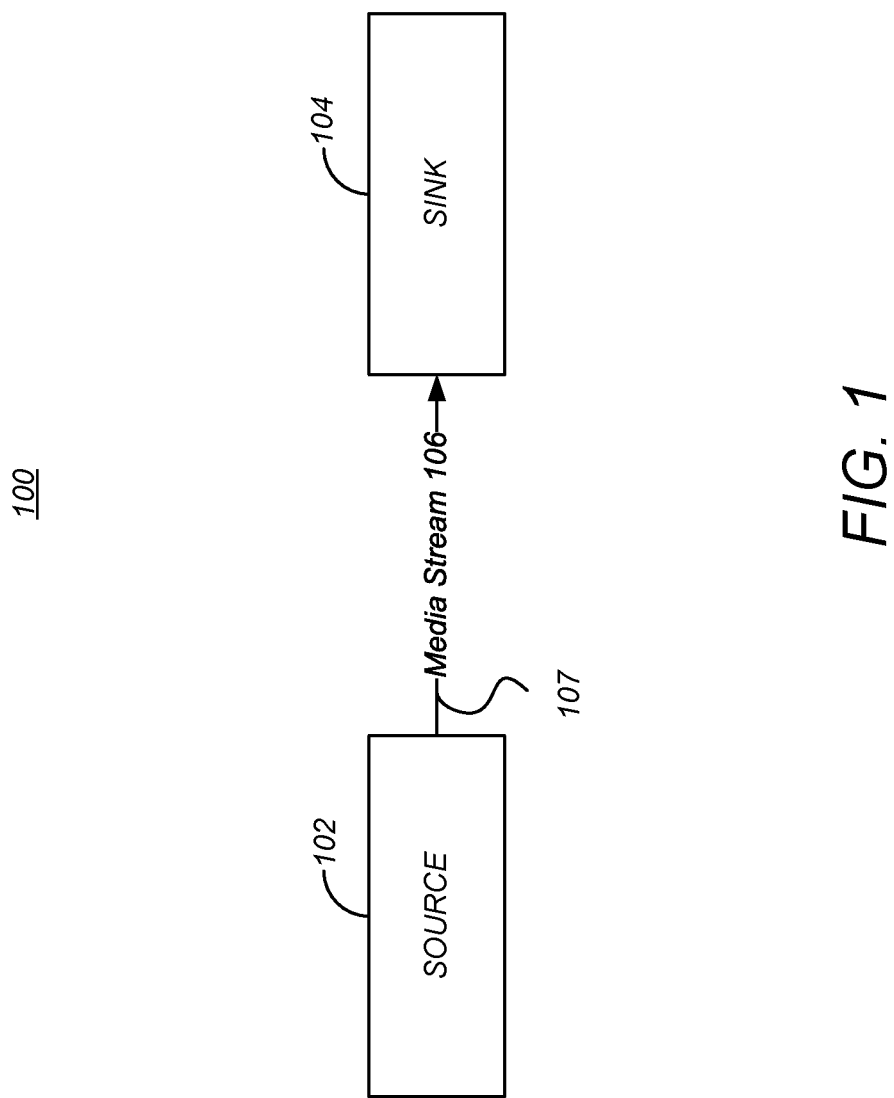
FIG. 1 is a diagram showing a typical media network complying with the DLNA standard.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A minimum of 3 data transmission/acquisition cadences are present in an HLS video stream: (1) the source 102 producing the content, (2) the transport facility 107, and (3) the sink 104. When a live event is being produced, the source 102 will create a production cadence based on the target duration for the media segments. As each segment is completed, it is passed off to the transport facility where a separate pacing will occur that follows the TCP protocol and this cadence is related to the capacity of the transport network elements to receive, buffer, and forward content as needed. The final consumption of the media segments is governed by the sink's manifest and media fetch cadence.

When the source produces media content in a different format (DLNA) than the consumer requires (HLS), timing synchronization has no meaning because the units of data are unrelated (as described above, DLNA transmits data in protected content packet (PCP) blocks which are larger than typical HLS media segments or chunks). Further, with a DLNA source, there is no production cadence to drive the process (instead, a continuous stream of media is created that is segmented based only on the constraint of the PCP block size) and the PCP blocks are typically not an integer multiple of HLS chunks. This results in potential system incompatibilities with regard to transmission and processing timing as well as block size.

This solution described below addresses the timing mismatches to prevent the occurrence of a duplicate playlist being presented to the sink 104 because a media segment is not produced in time for the consumer. The solution includes two innovative changes to the blind chunking algorithm.

The first innovation handles issues that occur at the PCP block boundaries by creating two chunks, one from the tail of content from the previous PCP block and the other from the start of the new PCP block, with the sums of the two chunks approximately equal to TARGETDURATION. This helps keep the manifest and chunk creation cadence from the proxy performing the conversion better aligned to the sink 104 (player) rate and assure that the player will always see a new TARGETDURATION worth of content when it requests a new manifest from the source 102.

The second innovation is to create chunks when the sink 104 requests a new manifest regardless of whether the proxy chunk timer (pulling data from the PCP block) has expired or not. This results in the sink 104 (1) being given data with minimal delay while (2) never being given a duplicate manifest (since a new manifest is provided with the newly pulled data from the PCP block). Duplicate manifests typically result in the player backing off by TARGETDURATION/2 before retrieving another manifest which can result in player buffer underflow, as described in Section 6.3.4, "HTTP Live Streaming draft-pantos-http-live-streaming-18", IETF-Draft Nov. 19, 2015, hereby incorporated by reference herein).

These innovations are implemented by a proxy serves to handle media segment acquisition for the sink 104. The proxy uses a target duration to time the acquisition of the DLNA media stream which is being transcoded and broadcast at a 1X video rate. Media segment production uses a timer to determine when to produce a media segment based on the available content in the transport buffers. This timer is employed in TCP socket client responsible for the actual reading of data from the TCP socket established with the source.

The available data is converted into a media segment with relevant metadata to allow an HLS manifest manager to publish the new media segment in an updated HLS event manifest.

The sink's requests for a HLS manifest are directed to an HLS manifest manager through an intermediate delegate that can monitor if the HLS manifest manager is going to provide a duplicate (stale) manifest. In the event that the manifest is stale, this delegate can pass a message to the proxy to terminate the TCP socket read operation early, causing it to pass the available data up to the proxy and onto the HLS manifest manager as a new media segment. The delegate monitors for a change of the HLS manifest for up to 100 ms and when a new manifest is detected, that manifest will be passed onto the consumer.

The conversion between protocols might otherwise be implemented by decrypting across PCP blocks to interrogate the video presentation and decode time stamps (presentation time stamps, or PTSs, as well as decode time stamps or DTSs) to create media segments or chunks of the required duration. However, such solutions are processor intensive because of the decryption operations.

Figure 2:
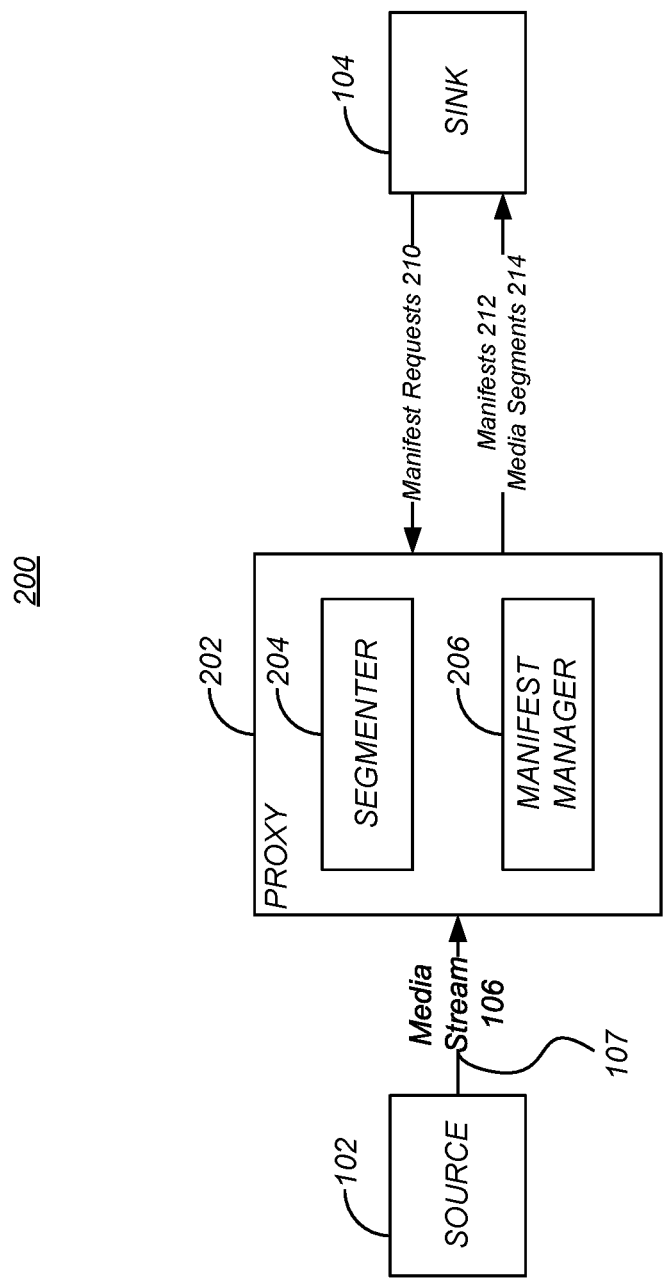
FIG. 2 is a diagram depicting an improved media network.

FIG. 2 is a diagram depicting an improved media network 200. As with the media network 100, the improved media network comprises a source 102 and a sink 104. The improved media network 200 also comprises a proxy 202, communicatively coupled between the source 102 and the sink 104. The proxy 202 includes a segmenter 204 for coding the video stream from the source 102 and a manifest manager 206 for accepting manifest requests from the sink 104, retrieving data from the source in response to the manifest requests, and providing manifests to the sink 104 on request. The sink 104 provides manifest requests 210 to the proxy 202 and receives manifests 212 and media segments 214 from the proxy.

Handling Block Boundaries

Figure 3:
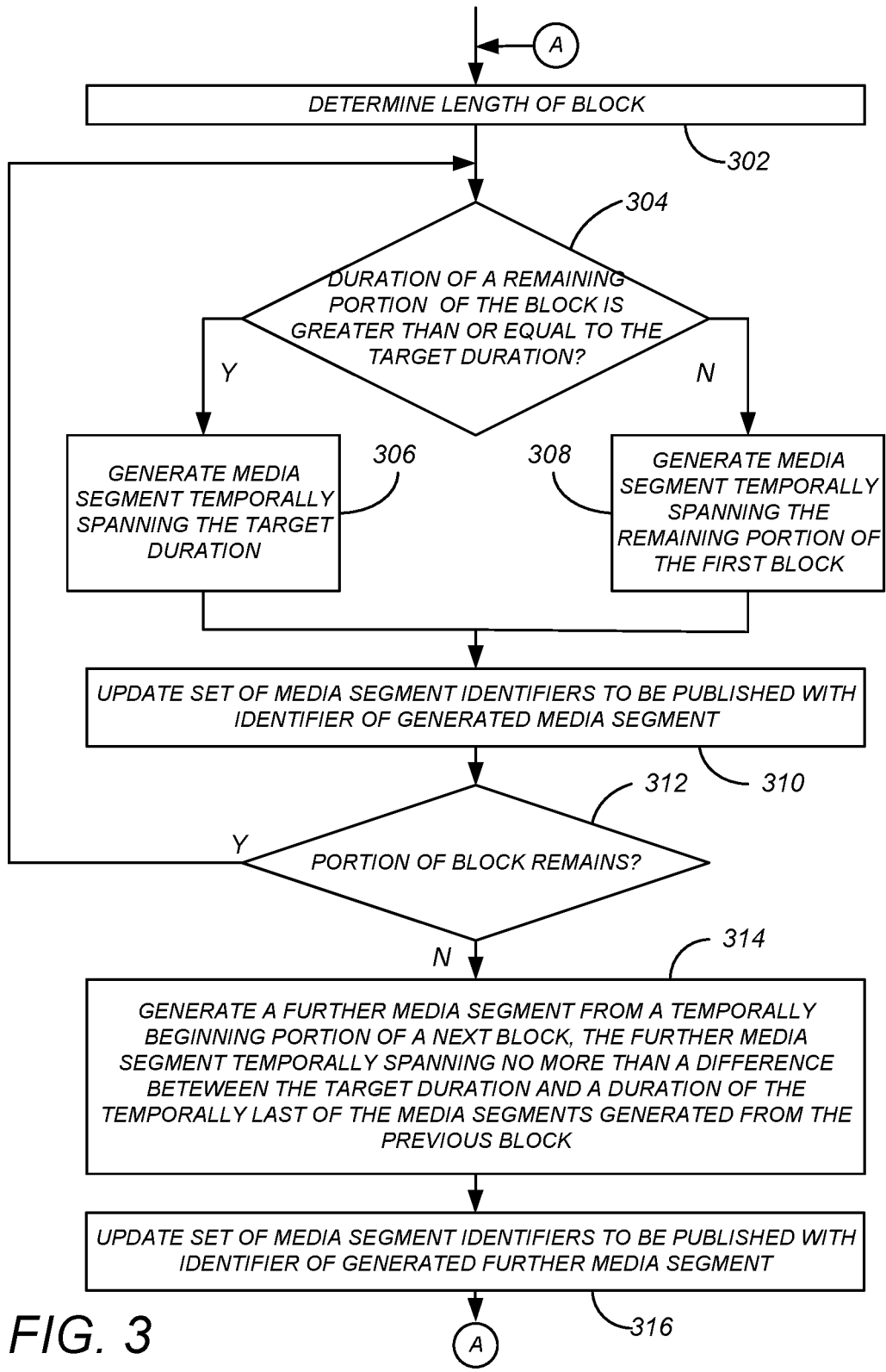
FIG. 3 is a diagram illustrating exemplary operations that can be used to code a media stream.

FIG. 3 is a diagram illustrating exemplary operations that can be used to segment the media stream. For illustrative purposes, FIG. 3 will be described with respect to FIG. 4A, which is a timing diagram illustrating one embodiment of the conversion of the media stream 106.

As a preliminary matter, a socket is opened to the source 102. In one embodiment, the socket is opened to the source 102 using the playback uniform resource locator (URL). Further, a time duration 404 is created for the socket read that is equal to a desired target duration 404 of the media segments 214. In one embodiment, this target duration 404 is one second.

Next, the length of the first block 402A of the media stream 106 is determined, as shown in flow chart element 302. In one embodiment, this is accomplished by making a read on the socket to obtain information from the media stream 106. For example, in DLNA compliant media streams 106 include a plurality of protected content packets (PCPs), each of which includes a PCP header appended with the PCP block having the media data itself.

The PCP header includes PCP block control information such as the PCP block length, encryption flags, and content key for the PCP block 402. The PCP header is then read and used to determine the length of the first block, as described in block 302. The reading of the PCP header may be accomplished by performing a 14 byte (B) read on the opened socket of the source 102. This 14 B read may be a blocking read that waits on the 14 B until an error or a timeout occurs, and may include a number of retries (which may vary according to implementation design choices) to allow for latency of the network 200 and/or the source 102. The PCP header is then parsed to obtain the PCP block length. The PCP block length is used to control the read loops 406 to obtain the video data from the media stream 106 as further described below.

Flow chart element 304 determines whether the temporal duration of the remaining portion of the first block 402A (the portion of the block 402A that has not been read) is greater than or equal to the target duration 404. If so, a media segment 214A is generated that spans the target duration 404, as shown in flow chart element 306. If not, a media segment 21 is generated that spans the remaining portion of the first block 402A, as shown in flow chart element 308.

Referring to FIG. 4, during the first pass of reading data from the first block 402A, the "remaining portion" of block 402A includes all of block 402A (e.g. portions 402A1-402AN, since none of the block 402A has yet been read). Hence, flow chart element 304 tests true and processing is passed to flow chart element 306 to generate a media segment 214A spanning the target duration 404.

Flow chart element 310 then updates a set 408 of media segment identifiers to be published with an identifier of the generated media segment 214A. Referring to FIG. 4, this is indicated by the media segment identifier "1" within the parens (at this point, the media identifier set has only one member). This set 408 of media identifiers is later used to generate a list of active media segments (e.g. active media segment list). The active media segment list includes identifiers for media segments 214 that have been generated, and are available for consumption by the sink 104, but have not yet been consumed.

Flow chart element 312 tests whether a portion of the first block 402A remains to be read. If a portion of block 402A remains to be read, processing is passed to flow chart element 304. Again, flow chart element 304 tests whether the duration of the remaining portion (now, portions 402A2-402AN) of the first block 402A is greater than or equal to the target duration. In the example shown in FIG. 4A, this is again the case, so processing is routed to flow chart elements 306 and 310, which compute another media segment 214B spanning the target duration 404, and updates the set 408 of media identifiers with an identifier "2" of the new media segment 214B. In this embodiment, identifiers of the newly generated media segments 214 are added to the identifier set 408 in first-in-first-out (FIFO) order, with each subsequent identifier postpended to the identifiers for existing, active (non-consumed) media segments 214.

Again, flow chart element 312 determines that a portion of the block 402A remains, so processing is routed to flow chart elements 304, 306 and 310 to generate another media segment 214C and update the set 408 of media segment identifiers to include an identifier (e.g. "3") for the newly generated media segment 214C. Again, flow chart element 312 determines that a portion of the first block 402A remains (e.g. portion 402AN), and processing is again passed to flow chart element 304. In this pass, however, flow chart element 304 tests false, because the duration of the remaining portion of the first block 402A (portion 402AN) is not greater than or equal to the target duration 404, but is instead less than the target duration 404. Hence, processing is passed to flow chart element 308, which generates a media segment 214D temporally spanning the remaining portion 402AN of the first block 402A. Flow chart element 310 then updates the set 408 of media segment identifiers to include an identifier "4" for the newly generated media segment 214D. In the illustrated embodiment, the identifier for the new media segment 214D is postpended to a list of active (non-consumed) media segments.

Processing is routed to flow chart 312 which again tests to determine whether any portion of the first block 402A remains uncoded into a media segment 214. If no portion of the first block 402A remains uncoded (e.g. all of the first block 402A has been coded into a media segment 214), processing is routed to flow chart element 314. Flow chart element 314 generates a further media segment 214E from a temporally beginning portion 402B1 of the next block 402B. The further media segment 214E temporally spans no more than the difference between the target duration 404 and a duration of the temporally last of the media segments 214D generated from the previous block 402A. In the embodiment illustrated in FIG. 4, the further media segment spans substantially or exactly the difference between the target duration 404 and the duration of media segment 214D, hence, the combined temporal duration of media segment 214D and 214E is equal to the target duration 404. Next, the set 408 of media segment identifiers is updated with an identifier ("5") of the newly generated further media segment 214E.

Processing is then returned to flow chart element 302 to repeat the processing of flow chart elements 302-316 for the remaining blocks 402 in the media stream 106 until the cancellation or the end of the media stream 106.

In one embodiment, the process described in flow chart elements 302-316 is implemented by a read process 406 that reads data from the PCB block 402A in real time, segmented by the lesser of the target duration (resulting in media segments of variable size, but equivalent temporal length) or the remaining portion of the PCB block 402A.

Specifically, this can be accomplished by requesting a socket client of the proxy 202 to read a target duration 404 worth of the PCP block 402A, or if the data remaining data in the PCP block 402A is less than a target duration 404, the remaining data in the PCP block 402A.

A no-wait read is issued to the socket for the remaining data amount. If the total read duration target (e.g. the target duration 404) is unmet, the socket read thread 406 is put to sleep for a period of time (e.g. 10 ms) and then the socket read request is reissued. If the total read duration has been met (e.g. because the temporal duration of the remaining portion of the PCP Block 402A is less than the target duration 404) or the amount of data remaining in the PCP Block 402A is now zero, then the read operation 406 is terminated and the read data is returned to the caller (e.g. the proxy 202). When the data read is completed, the data is conformed 412 to a four transport packet boundary, for example, 752 bytes. If the conforming process 412 results in any leftover bytes of data, these leftover bytes are returned to a new input buffer and subsequent data is appended to the leftover bytes of data in this input buffer. The conformed data buffer 415 is handed over to a media segmentation class to retain the metadata (including a media segment identifier) and video data for the media segment 214. This new media segment 214 object is then passed to an HLS manifest management class where it is added to the cache storing the set of media segment identifiers 408.

In one embodiment, media segments 214 (and their identifiers 408) are tracked on three lists: (1) a list of the unpublished identifiers of generated media segments (2) a list of published, active identifiers of generated media segments, and (3) a list of published, expired generated media segments. Newly generated media segment identifiers are pushed to the first position on the active segment list (e.g. prepended) to the active segment list. When the maximum number of media segment identifiers on the active segment list is reached, the eldest media segment entry is removed from the active segment list. In the embodiment illustrated in FIG. 4, the maximum number of identifiers 408 in the active segment list in the list is five, but other maximums may also be used. When the expired segment limit is reached, 2*active limit+1, the last media segment entry is popped from the list.

In one embodiment, media segments 214 (and their identifiers 408) are tracked on three lists, as illustrated in Table I (below). The first list is a list of unpublished identifiers. The identifiers 408 of newly generated media segments 214 are postpended into a list of unpublished identifiers. Upon a manifest request from the sink 104, the identifiers on the list of unpublished identifiers are postpended to the list of active identifiers (the active manifest list), the list of active identifiers is published, and the (formerly unpublished) identifiers are removed from the list of unpublished identifiers. This process is repeated for newly generated media segments. When the number of identifiers on the list of active identifiers exceeds a maximum value (in Table I, the maximum number of active identifiers is five), identifiers are removed from the active list of identifiers, and are postpended to a list of expired identifiers, so as to keep the number of identifiers on the list of active identifiers at or below the maximum value. Further, the identifiers are removed from the list of active identifiers and placed on the list of expired identifiers on a first-in-first-out (FIFO) basis, so that the identifiers that have been on the active list for the longest time are removed first. Finally, identifiers on the list of expired identifiers are also removed based on the limit established in the HLS specification on a FIFO basis.

In the example shown in Table I below, identifier "1" is associated with the first media segment, and is placed on the unpublished identifier list. When the sink 104 makes a manifest request, this identifier is removed from the unpublished identifier list, and placed on the active identifier list, which is published. Next, identifier "2" is associated with the second (and subsequent) media segment, and is placed on the unpublished identifier list. Again, when the sink 104 makes a manifest request, this identifier is removed from the unpublished identifier list and postpended (added to the end of) the active identifier list. Upon a manifest request from the sink 104, the active identifier list is again published, with identifier members (1,2).

Next, an identifier for a newly-generated media segment ("3") is generated, added to the unpublished identifier list, and before the sink 104 requests another manifest, an identifier for another newly generated media segment ("4") is generated, and postpended to the unpublished identifier list. When the sink 104 requests another manifest, both identifiers (3,4) are postpended to the active identifier list, which is published, and removed from the unpublished identifier list. This process is repeated for newly generated media segment ("5').

Next, an identifier for newly-generated media segment ("6") is generated, and added to the unpublished identifier list. This identifier is postpended to the active identifier list upon a manifest request from the sink 104, and since the maximum number of members of the active identifier list is five, an identifier is removed from the active identifier list (on a FIFO basis) and placed on the expired identifier list. In the illustrated example, this is identifier "1".

Next, identifiers for the next newly-generated media segments ("7", then "8") is generated and added to the unpublished identifier list. These identifiers are postpended to the active identifier list upon a manifest request received from the sink 104. Since two identifiers have been added to the active identifier list, two must be removed, and the eldest of the identifiers on the active identifier list are removed and postpended to the expired identifier list. The process repeats as new identifiers for the next newly generated media segments ("9", "10" and "11" with manifest requests therebetween. Identifier for the next newly generated media segment ("12") is postpended to the active identifier list and removed from the unpublished identifier list, and identifier "7" is removed from the active identifier list and postpended to the expired identifier list. In the illustrated embodiment, the expired identifier list is also limited to five members, so the eldest member of that list ("1") is removed.

Next, if a manifest request is made before a typical read cycle has been completed, an interim media segment is created from the portion of the block that has been read during the read cycle, and an identifier ("13") is postpended to the active identifier list.

TABLE I

| Event | Unpublished | Manifest Active | Manifest Expired |
|---|---|---|---|
| Read | 1 | | |
| Manifest Req | | 1 | |
| Read | 2 | | |
| Manifest Req | | 1, 2 | |
| Read | 3 | | |
| Read | 3, 4 | | |
| Manifest Req | | 1, 2, 3, 4 | |
| Read | 5 | | |
| Manifest Req | | 1, 2, 3, 4, 5 | |
| Read | 6 | | |
| Manifest Req | | 2, 3, 4, 5, 6 | 1 |
| Read | 7 | | |
| Read | 7, 8 | | |
| Manifest Req | | 4, 5, 6, 7, 8 | 1, 2, 3 |
| Read | 9 | | |
| Manifest Req | | 5, 6, 7, 8, 9 | 1, 2, 3, 4 |
| Read | 10 | | |
| Manifest Req | | 6, 7, 8, 9, 10 | 1, 2, 3, 4, 5 |
| Read | 11 | | |
| Manifest Req | | 7, 8, 9, 10, 11 | 1, 2, 3, 4, 5, 6 |
| Read | 12 | | |

TABLE I-continued

| Event | Unpublished | Manifest Active | Manifest Expired |
|---|---|---|---|
| Manifest Req | | 8, 9, 10, 11, 12 | 2, 3, 4, 5, 6, 7 |
| Manifest Req | | 9, 10, 11, 12, 13 | 3, 4, 5, 6, 7, 8 |

When a PCP block 402 has been fully read, the duration of the last media segment 214 of that block 402 (e.g. media segment 214D of PCP block 402A) is checked for the duration being less than a fraction of the target duration 404. For example, in embodiments where the target duration 40 is one second, the duration of the last media segment may be checked to determine if it is less than 100% of the target duration 404, or 1 s, in this example 214D is 800 ms. If it is, the duration of the first media segment 214E of the next PCP block 402B is adjusted to be the difference of time between the target duration 404 and the duration of the last media segment 214, 200 ms. To account for timing maladjustments, this computation can be performed with a number less than the target duration. For example, in embodiments where the target duration is one second, the duration of the first media segment 214 of the next PCP block 402B may be adjusted to be the difference between 950 ms and the duration of the last media segment 214D. With the exception of this adjustment to the first media segment duration, all PCP blocks are read as described in step 4 until the stream fails or is canceled.

Creating Media Segments Upon a Manifest Request

As described above, another innovation described in this disclosure involves creating media segments 214 when the sink 104 requests a new manifest regardless of whether a proxy chunk timer (pulling data from the PCP block 402) has expired or not. This results in the sink 104 (1) being given data with minimal delay while (2) never being given a duplicate manifest (since a new manifest is provided with the newly pulled data from the PCP block 402).

Figure 5:
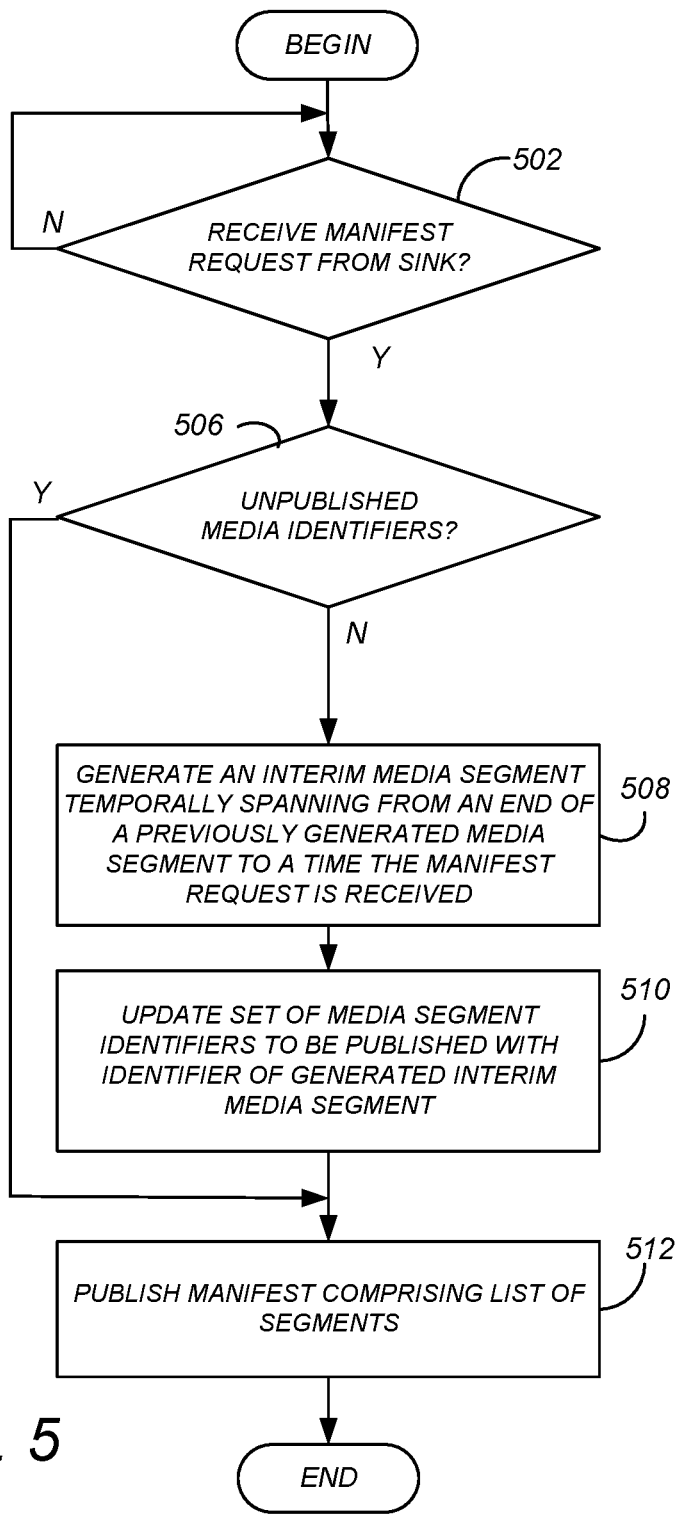
FIG. 5 is a diagram illustrating one embodiment of how media segments may be created upon a manifest request.

FIG. 5 is a diagram illustrating one embodiment of how media segments may be created upon a manifest request 210. Flow chart element 502 determines if a manifest request 210 has been received from the sink 104. If no manifest request 210 has been received, processing is returned to flow chart element 502. When a manifest request 210 has been received, processing is routed to flow chart element 504. Hence, flow chart element 502 depicts a processing loop monitoring for a manifest request 210 from the sink 104.

Flow chart element 506 determines whether there are any unpublished media identifiers that have been generated. This may be the case, for example, when the set of media segment identifiers has been updated with a new media segment identifier (e.g. at media segment update 420D to account for newly generated media segment 214D) at the end of a block 402. If there are unpublished media identifiers, processing is routed to flow chart element 512, which publishes a manifest comprising the list of segments (and including the unpublished segment identifier). This is illustrated by the published manifests 212A-212F illustrated in FIG. 4B.

In some circumstances, the set of media segments does not include unpublished identifiers when the manifest request 210 is received. This may occur, for example, if timing differences cause the manifest request 210 to be received shortly before completion of a read cycle, as shown in FIG. 4C. If the set of media segment identifiers does not include unpublished identifiers when the manifest request 210 is received, processing is passed to flow chart element 508, which generates an interim media segment temporally spanning from an end of the previously generated media segment to a time the manifest request 210 is received. Then, the set of media identifiers to be published is updated with the identifier of the generated interim media segment, as shown in flow chart element 510. Finally, the manifest comprising the list of segments is published, as shown in block 512. This results in the generation of a shorter media segment 214F', and the shift of the generation of future media segments (214G-214H).

Further, it is possible for a manifest request 210 to be received at any time during any of the blocks 402 (e.g. not at the interval of the target duration 404). This is illustrated, for example, in FIG. 4D, in which manifest request 210E' is received between manifest requests 210E and 210F. In this case, flow chart element 506 routes processing to flow chart elements 508 to generate an interim media segment 214G' temporally spanning from an end of the previously generated media segment 214F to a time at which the manifest request 210E' was received and flow chart element 510, which updates the set of media segment identifiers 420F' to be published with an identifier of the generated interim media segment 214G'. Then, the manifest is published comprising the updated list of segments. Further segments are created according to the newly established cadence. For example, the following media segment is generated for a target duration's worth of the block 402.

Timing Considerations

Figure 6:
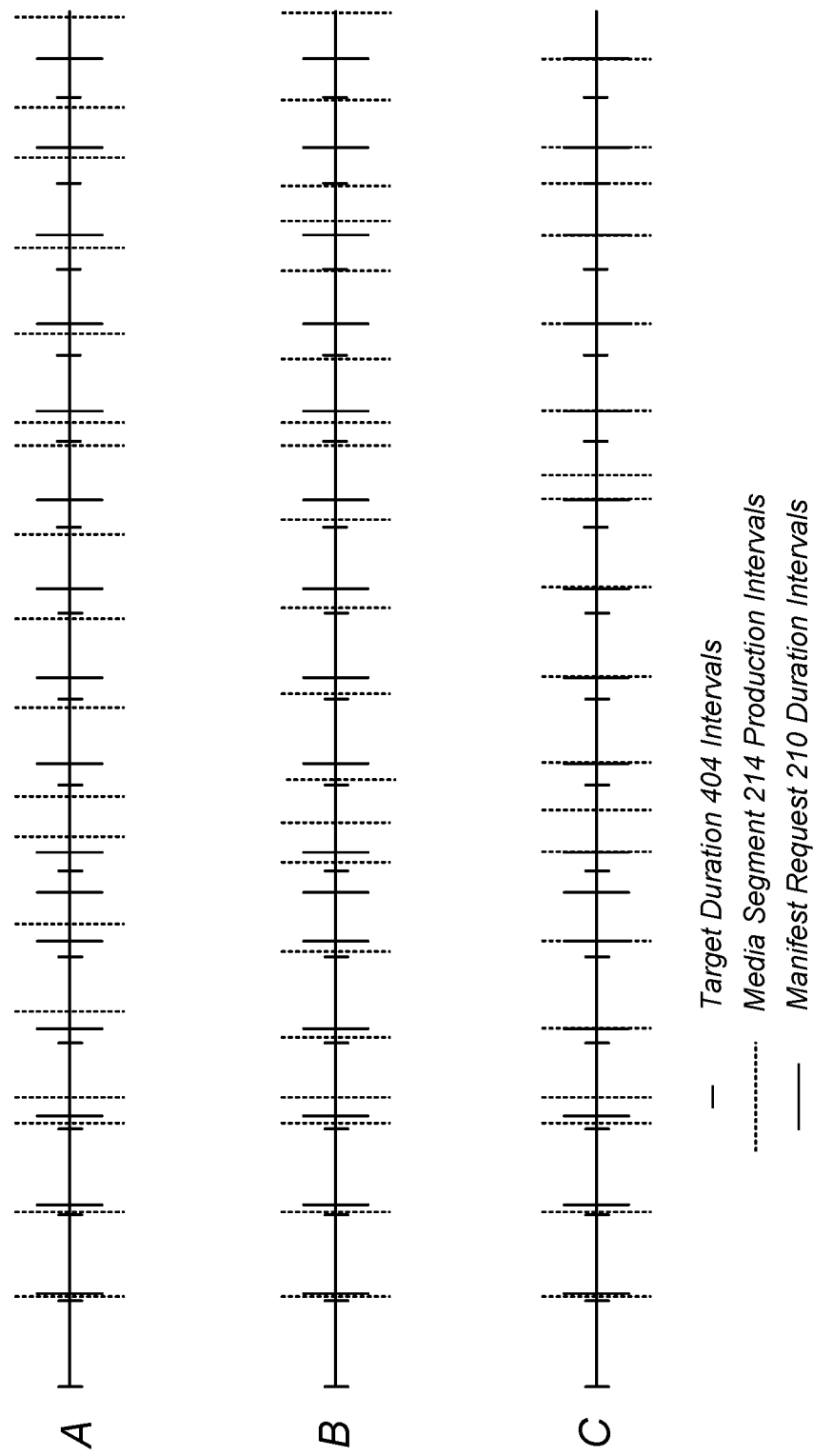
FIG. 6 is a diagram illustrating a timing relationship between target duration intervals, media segment production intervals and manifest requests from the sink.

FIG. 6 is a diagram illustrating a timing relationship between target duration 404 intervals, media segment 214 production intervals and manifest requests 210 from the sink 104.

Media segment 214 production begins with a target duration 404 that sets a desired production cadence for the media segments 214. This target duration 404 is published in the HLS manifest 212 and is subsequently used by a sink 104 to manage the media segments 214 and their rendering/playback.

This timing is independent of the actual transfer of content from the source 102 device or the pacing of manifest requests 210 that can come from the sink 104. Timeline A illustrates a timeline showing the relationship among cadences present in a DLNA stream being converted to an HLS stream. The short lines indicate target duration intervals, elongated dashed lines indicate the production of media segments from the DLNA stream, and the solid lines indicate the cadence of HLS manifest requests from the player sink 104. There is a shift of the media segment duration (dashed line) due to overhead and timing of the read loops within the socket client and the DLNA proxy. The HLS manifest requests also process due to requests occurring at a cadence of the target duration 404 plus some additional time, which may, for example, account for a prediction of the overhead to produce a media segment 214 at the source 102. When a short end of PCP block media segment 214 is produced, the DLNA media segment cadence (long dashed line) adjusts to a new target duration 404 cycle that publishes media segments 214 significantly out of sync with the HLS manifest request cadence.

Figure 4A:
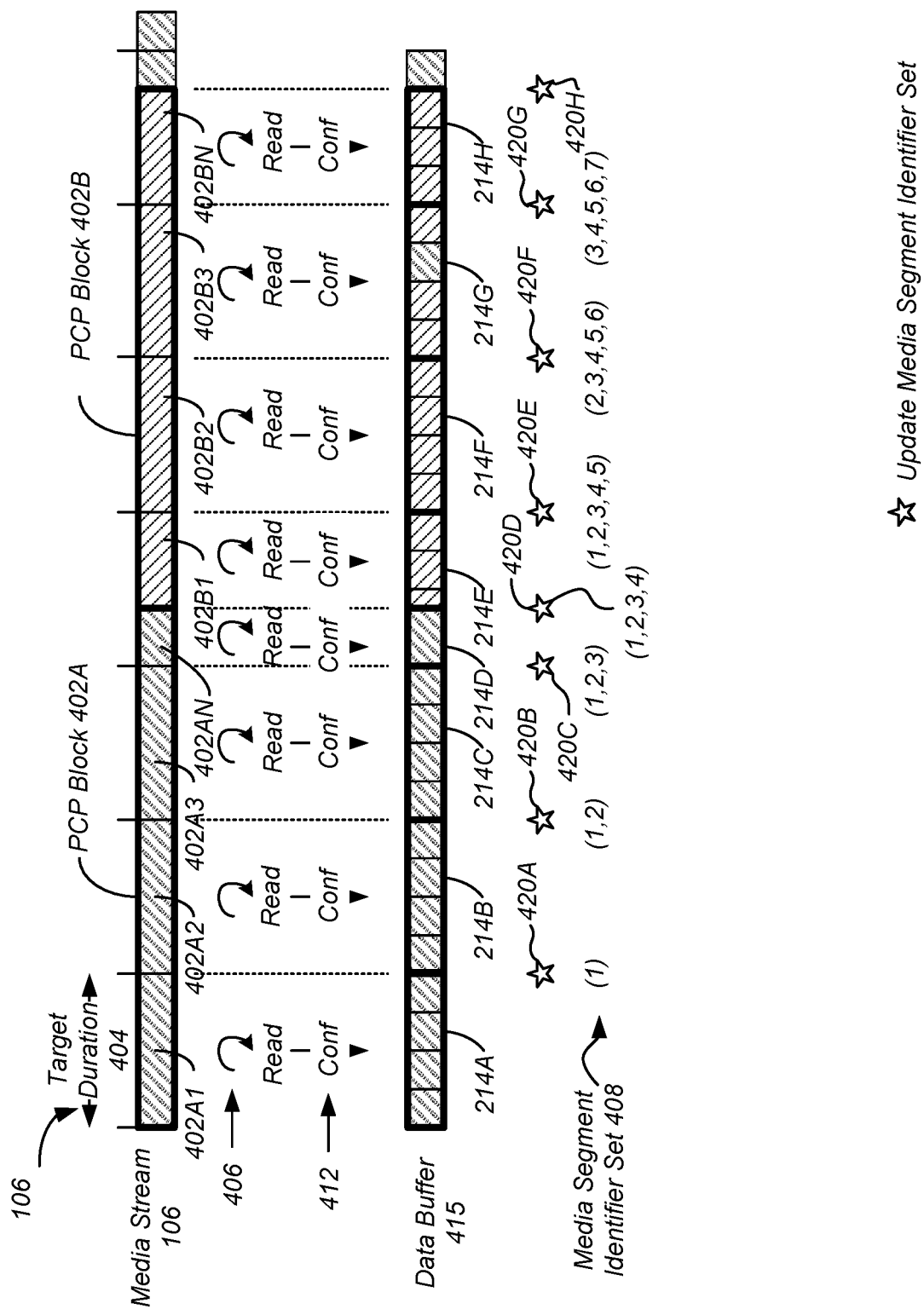
FIGS. 4A-4D which is a timing diagram illustrating embodiments of the conversion of the media stream.
Figure 4B:
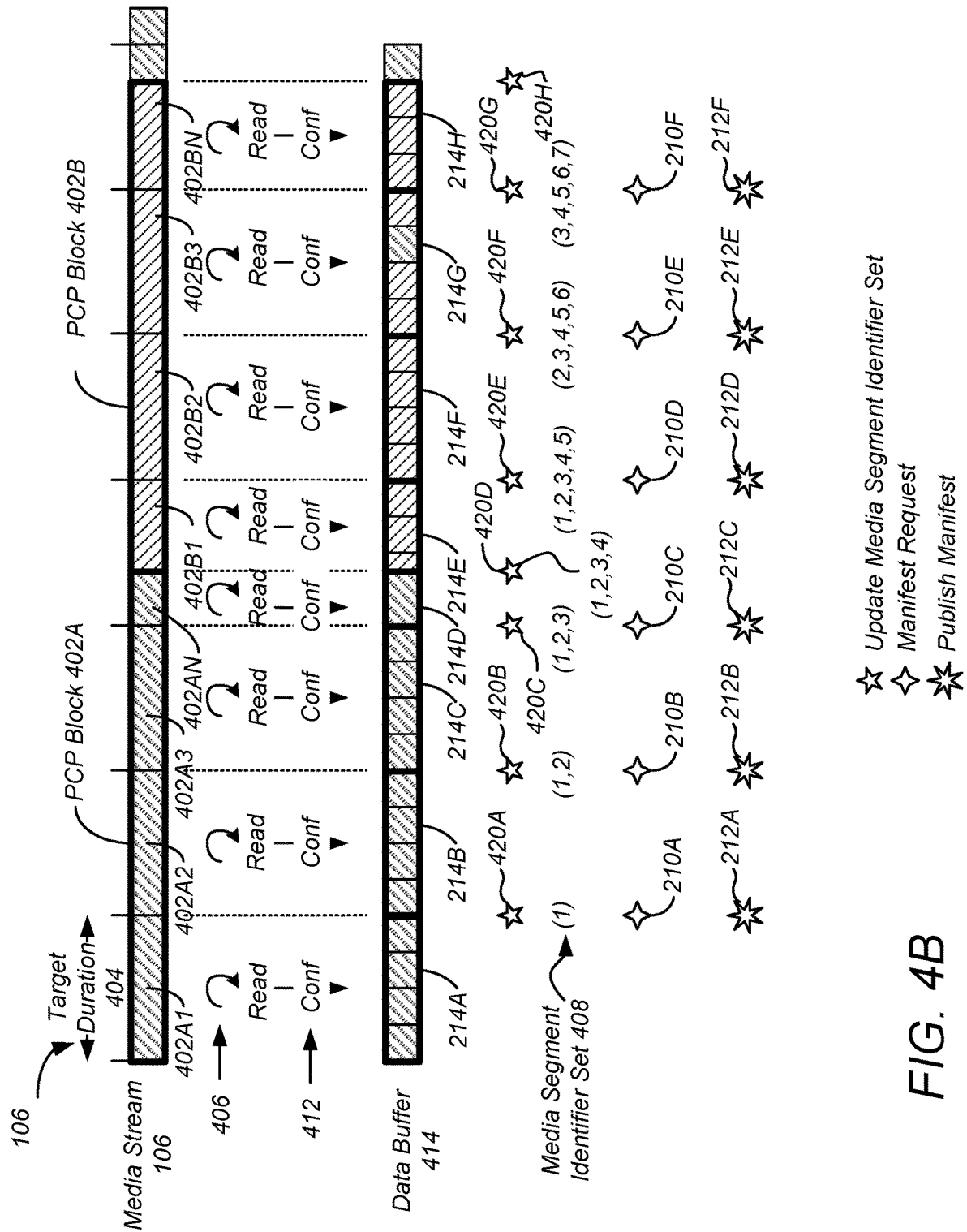
Figure 4C:
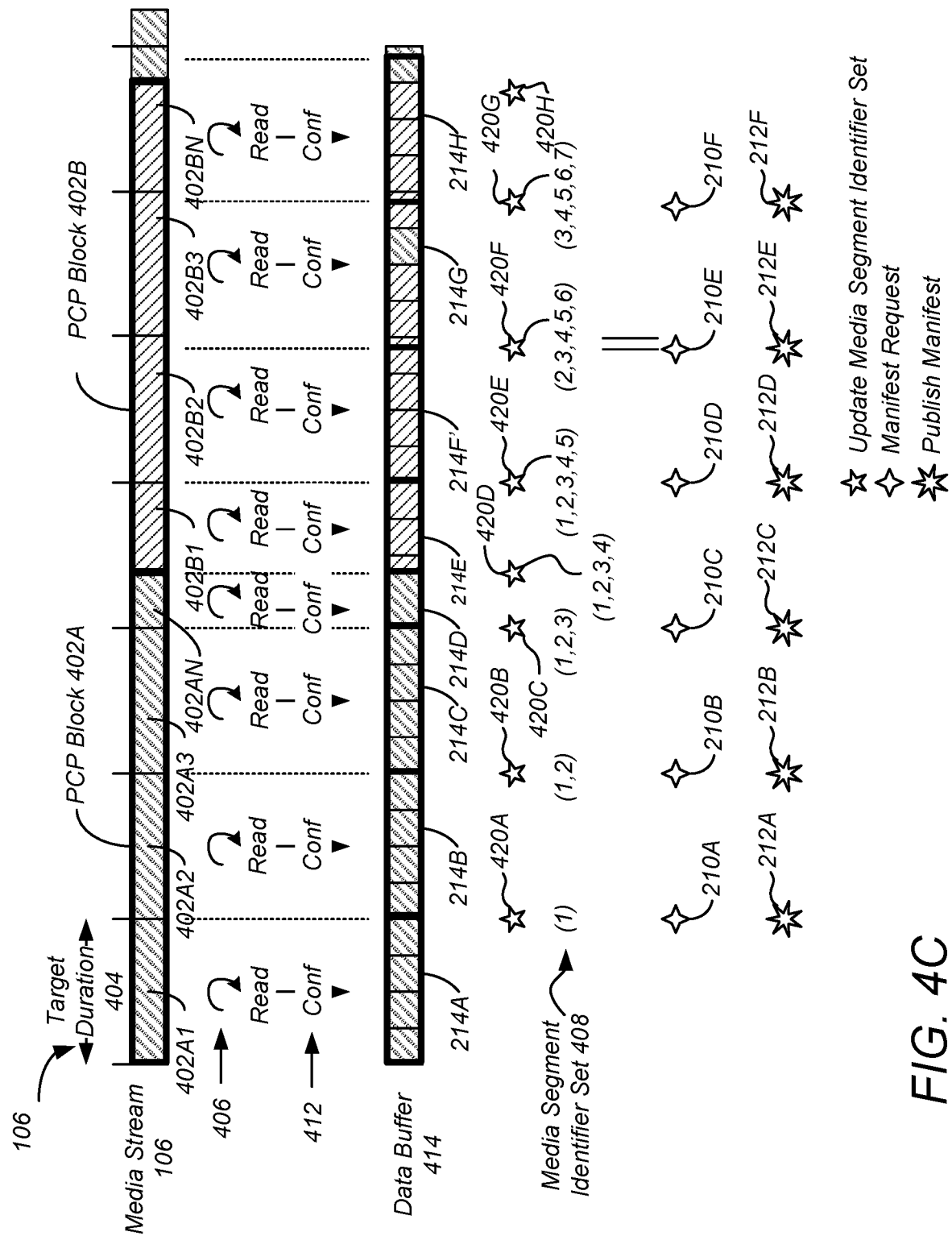

Timeline B is a timeline showing the relationship among cadences present in a DLNA stream being converted into an HLS stream using the techniques illustrated in FIGS. 3, 4A and 4B. In this timeline, the timing was adjusted to compensate for the poor synchronization between the end of the PCP block 402. As described above, this is accomplished by creating a second, shorter media segment 214D created from the initial read of the new PCP block 402 in order to publish the new media segment 214D in time for the succeeding HLS manifest request. This approach improves the synchronization but is subject to a divergence of the cadence.

Figure 4D:
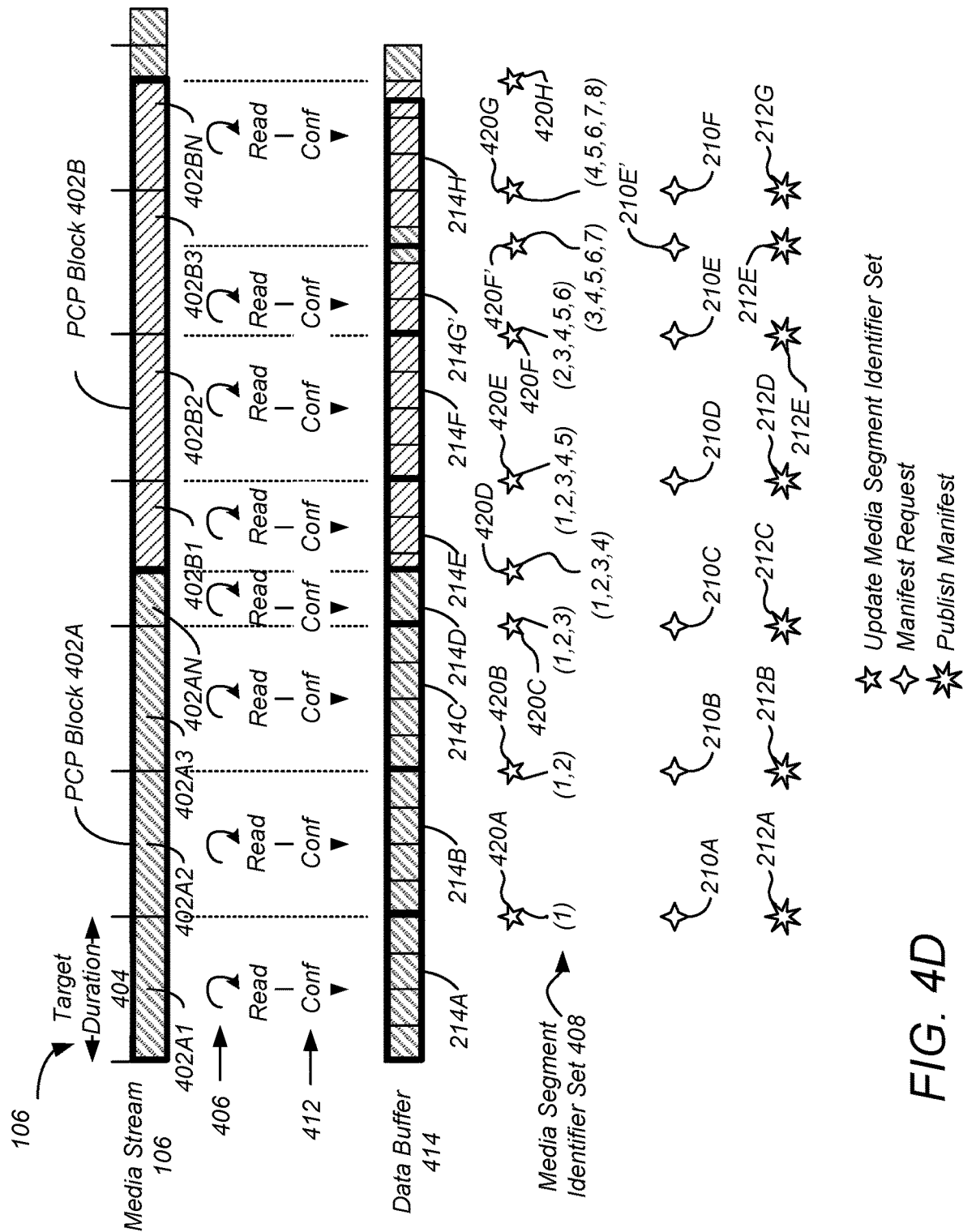

Timeline C is a timeline showing the relationship among cadences present in a DLNA stream being converted to an HLS stream using the techniques shown in FIGS. 5, 4C and 4D.

This timeline shows the anticipated effect of making the DLNA media segment production sensitive to the HLS manifest request. Rather than holding off the sink 102 making the manifest request 210E' and publishing a duplicate manifest 212E, the manifest request 210E' immediately triggers (if the DLNA timers or read limits have not been reached) the creation of a new media segment 214G'. This ensures that a new media segment (e.g. 214G') is always available to the sink. Further, the generation of all subsequent media segments 214 follow the manifest request cadence established by this manifest request 420F.

Hardware Environment

Figure 7:
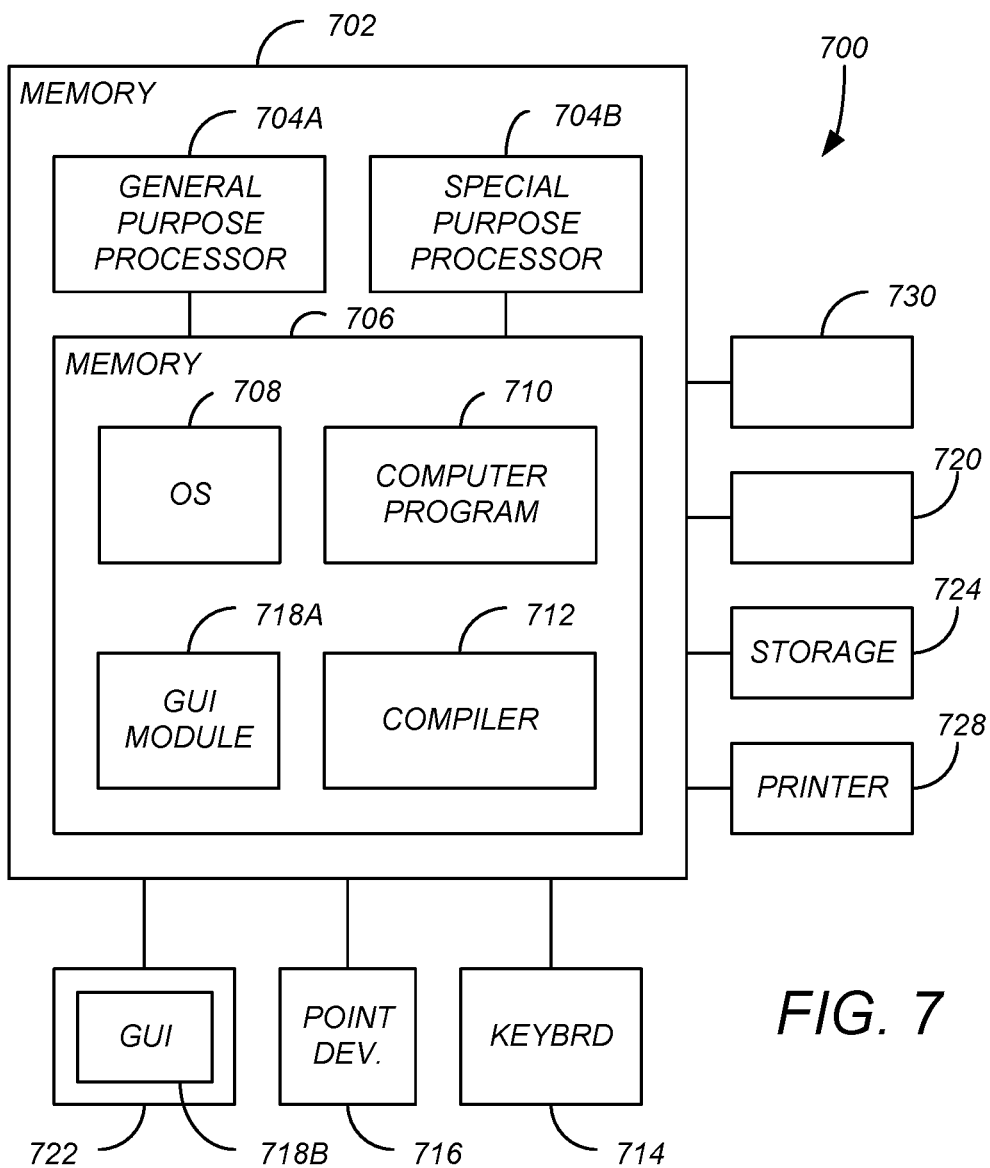
FIG. 7 is a diagram illustrating an exemplary computer system that could be used to implement elements of the proxy.

FIG. 7 is a diagram illustrating an exemplary computer system 700 that could be used to implement elements of the network 200, including the source 102, the proxy 202 and the sink 104. The computer 702 comprises a general purpose hardware processor 704A and/or a special purpose hardware processor 704B (hereinafter alternatively collectively referred to as processor 704) and a memory 706, such as random access memory (RAM). The computer 702 may be coupled to other devices, including input/output (I/O) devices such as a keyboard 714, a mouse device 716 and a printer 728.

In one embodiment, the computer 702 operates by the general-purpose processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708 to provide output and results.

Output/results may be presented on the display 722 or provided to another device for presentation or further processing or action. In one embodiment, the display 722 comprises a liquid crystal display (LCD) having a plurality of separately addressable pixels formed by liquid crystals. Each pixel of the display 722 changes to an opaque or translucent state to form a part of the image on the display in response to the data or information generated by the processor 704 from the application of the instructions of the computer program 710 and/or operating system 708 to the input and commands. Other display 722 types also include picture elements that change state in order to create the image presented on the display 722. The image may be provided through a graphical user interface (GUI) module 718A. Although the GUI module 718A is depicted as a separate module, the instructions performing the GUI functions can be resident or distributed in the operating system 708, the computer program 710, or implemented with special purpose memory and processors.

Some or all of the operations performed by the computer 702 according to the computer program 710 instructions may be implemented in a special purpose processor 704B. In this embodiment, some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 702 may also implement a compiler 712 which allows an application program 710 written in a programming language such as COBOL, C++, FORTRAN, or other language to be translated into processor 704 readable code. After completion, the application or computer program 710 accesses and manipulates data accepted from I/O devices and stored in the memory 706 of the computer 702 using the relationships and logic that was generated using the compiler 712.

The computer 702 also optionally comprises an external communication device such as a modem, satellite link, Ethernet card, or other device for accepting input from and providing output to other computers.

In one embodiment, instructions implementing the operating system 708, the computer program 710, and/or the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, or a flash drive. Further, the operating system 708 and the computer program 710 are comprised of computer program instructions which, when accessed, read and executed by the computer 702, causes the computer 702 to perform the steps necessary to implement and/or use the present invention or to load the program of instructions into a memory, thus creating a special purpose data structure causing the computer to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 702. Further, the system(s) described herein can be implemented as one or more software modules comprising instructions being performed by one or more special or general purpose processors, or may be implemented with hardware modules having dedicated circuitry, or with both hardware and software modules.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of coding a video stream, the method comprising receiving a given block of video data comprising a portion of the video stream for real time coding, all of the video stream not yet received, and encoding the video stream by:
classifying the given block into at least one encoded segment all having equal duration and a remaining unencoded segment with a different duration from that of the at least one encoded segment;
determining a magnitude of the duration of the remaining unencoded segment in relation to the equal duration of each encoded segment;
when the magnitude of the duration of the remaining unencoded segment is not less than the equal duration of the at least one encoded segment, encoding a portion of the unencoded segment having a duration equal to that of the at least one encoded segment, and classifying the portion as a one of the at least one encoded segment
when the magnitude of the duration of the remaining unencoded segment is less than the equal duration of the at least one encoded segment, without padding the video stream, encoding the remaining portion and subsequently encoding a first portion of a next sequential block to the given block, where the sum of the duration of the encoded remaining portion and the duration of the first portion of the next sequential block is that of the equal duration of the at least one encoded segment of the first block
updating a set of media segment identifiers to be published with the encoded media segments; and.

2. The method of claim 1, further comprising
receiving a request for a manifest, the manifest comprising the list of the set of media segment identifiers; and
in response to the receiving of the request for the manifest at the interval of the target duration
determining if the set of media segment identifiers includes media segment identifiers that have not been published;
if the set of media segment identifiers includes media segment identifiers that have not been published, publishing the manifest comprising the list of the set of media segment identifiers;
if the set of media segment identifiers does not include media segment identifiers that have not been published, generating an interim media segment temporally spanning from an end of a previously generated media segment to a time the manifest request is received; and
updating the set of media identifiers with the identifier of the generated interim media segment; and
publishing the manifest comprising the list of the media segment identifiers including the identifier of the generated interim media segment.

3. The method of claim 2, wherein:
the list of media segment identifiers comprises at most N media segment identifiers;
updating the list of media segment identifiers with an identifier of the generated media segment comprises:
postpending the list of the media segment identifiers with the identifier of the generated segment;
removing a temporally oldest identifier of the list of media segment identifiers from the list of the media segment identifiers if the appended list of the media segment identifiers includes more than N media segment identifiers;
updating the list of media segment_identifiers with the identifier of the generated interim media segment comprises:
postpending the list of the media segment identifiers with the identifier of the generated interim media segment;
removing a temporally oldest identifier of the list of media segment identifiers from the list of the media segment identifiers if the appended list of the media segment identifiers includes more than N media segment identifiers.

4. The method of claim 1, further comprising:
reading a block header describing the block length; and
controlling a read loop of the video stream according to the target duration and the block length to read the video stream.

5. The method of claim 1, wherein the video stream is a digital living network alliance compliant video stream, and the media segments are HTTP live streaming (HLS) compliant media segments.

* * * * *